US007685123B1

(12) United States Patent
Thompson et al.

(10) Patent No.: US 7,685,123 B1
(45) Date of Patent: Mar. 23, 2010

(54) METHOD AND SYSTEM FOR CONTROLLING ACCESS TO DYNAMICALLY SPECIFIED RESOURCES

(75) Inventors: Timothy J. Thompson, San Jose, CA (US); James Hartwell Holl, II, Los Gatos, CA (US); Bill Raoul Durant, Alamo, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 243 days.

(21) Appl. No.: 11/513,860

(22) Filed: Aug. 30, 2006

(51) Int. Cl.
*G06F 17/30* (2006.01)

(52) U.S. Cl. .......................... 707/9; 711/163; 713/182; 726/1; 726/2

(58) Field of Classification Search ....... 707/1, 707/9, 10, 100, 103 R, 200; 711/163; 713/153, 713/167, 182; 726/1, 2, 27
See application file for complete search history.

(56) References Cited

U.S. PATENT DOCUMENTS

| | | | | |
|---|---|---|---|---|
| 5,911,143 A | * | 6/1999 | Deinhart et al. | ......... 707/103 R |
| 6,757,901 B1 | * | 6/2004 | McCloghrie et al. | ........ 719/318 |
| 7,340,469 B1 | * | 3/2008 | Alghathbar et al. | ........... 707/10 |
| 2005/0021977 A1 | * | 1/2005 | Oberst | ......................... 713/182 |
| 2005/0114661 A1 | * | 5/2005 | Cheng et al. | ................. 713/167 |
| 2005/0229236 A1 | * | 10/2005 | Devgan et al. | .................. 726/1 |

OTHER PUBLICATIONS

Clarke et al., On the Use of Regular Expressions for Searching Text, May 1997, ACM, pp. 413-426.*
Belokosztolski_et_al.; Meta-Policies for Distributed Role-Based Access Control Systems.*
Ferraiolo_et_al.; Role_Based Access Control.*
Ravi Sandhu; Transaction Control Expressions for Separation of Duties.*
Shih-Chien Chou; Role_Based Access Control.*
Ahn et al., Role-based authorization constraints specification using ObjectConstraint Language, 2001, IEEE, pp. 157-162.*

* cited by examiner

*Primary Examiner*—Fred I Ehichioya
(74) *Attorney, Agent, or Firm*—Blakely, Sokoloff, Taylor & Zafman LLP (57) ABSTRACT

In an RBAC system, a capability is defined as including an operation and an object on which the operation is to be performed. The capability is assigned to a role, which is in turn assigned to a user. Then the user will have the authorization to perform the operation on the object. Rather than specifying the object by predetermining the identity of the object, an expression (e.g., a regular expression, a query, etc.) may be specified in place of the predetermined object. In response to a request initiated by a user, the expression is then evaluated to determine the identity of the object(s) on which the operation may be performed.

23 Claims, 6 Drawing Sheets

METHOD AND SYSTEM FOR CONTROLLING ACCESS TO DYNAMICALLY SPECIFIED RESOURCES

FIELD OF THE INVENTION

At least one embodiment of the present invention pertains to access control systems, and more particularly, to a Role Based Access Control (RBAC) system.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Filers are made by Network Appliance, Inc. of Sunnyvale, Calif.

In a SAN context, the storage server provides clients with block-level access to stored data, rather than file-level access. Some storage servers are capable of providing clients with both file-level access and block-level access, such as Filers made by Network Appliance, Inc.

A business enterprise or other organization that manages large volumes of data may operate one or more storage servers. These storage servers may be connected to each other through one or more networks. The storage servers and other network components may be managed by one or more network administrators (also called "administrative users" or simply "administrators"), who are responsible for configuring, provisioning and monitoring the storage servers, scheduling backups, troubleshooting problems with the storage servers, performing software upgrades, etc. These management tasks can be accomplished by the administrator using a separate management console on the network, which is a computer system that runs storage management application software specifically designed to manage a distributed storage infrastructure. An example of such a storage management application is DataFabric® Manager (DFM), made by Network Appliance, Inc. of Sunnyvale, Calif.

To prevent unauthorized users from accessing and controlling functions of the storage servers, there is a need for some form of access control. One form of access control is Role Based Access Control (RBAC). Within an organization, roles are created for various job functions. The permission to perform certain functions is assigned to specific roles. Members of staff (or other system users) are assigned particular roles, and through those role assignments acquire the permissions to perform particular system functions.

Since users are not assigned permissions directly, but only acquire them through their role (or roles), management of individual user rights becomes a matter of simply assigning the appropriate roles to the user, which simplifies common operations such as adding a user, or changing a user's department.

In an RBAC system, a role may be assigned the permission to perform an operation on an object. An object is an entity within a system. An object may be a composite object containing one or more other objects, or a simple object containing no other objects. Here, the phrase "perform an operation on an object" has the meaning of both performing the operation on the object and performing the operation within the object. The object may be a logical object or a physical object. Examples of logical object include a bank account in a banking system, a volume in a network storage system, or a role in an RBAC system. Examples of physical object include a harddrive, a network interface card, etc. When a permission to perform an operation on an object is assigned to a role, the object is statically specified. That is, the identity of the object is already determined at the time the permission is assigned to the role. The static mechanism, however, limits the flexibility of the RBAC system, especially when the system (such as a network storage system) that the RBAC system is controlling changes frequently.

SUMMARY OF THE INVENTION

The present invention includes a method and system for controlling access to dynamically specified resources. The method may be implemented in a role based access control system. The method includes the step of receiving input specifying an expression for use in identifying a first object on which a role has authorization to perform an operation. The method further includes the step of evaluating the expression in the role based access control system to identify the first object in response to a request initiated by the role to perform the operation.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for controlling access to dynamically specified resources are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
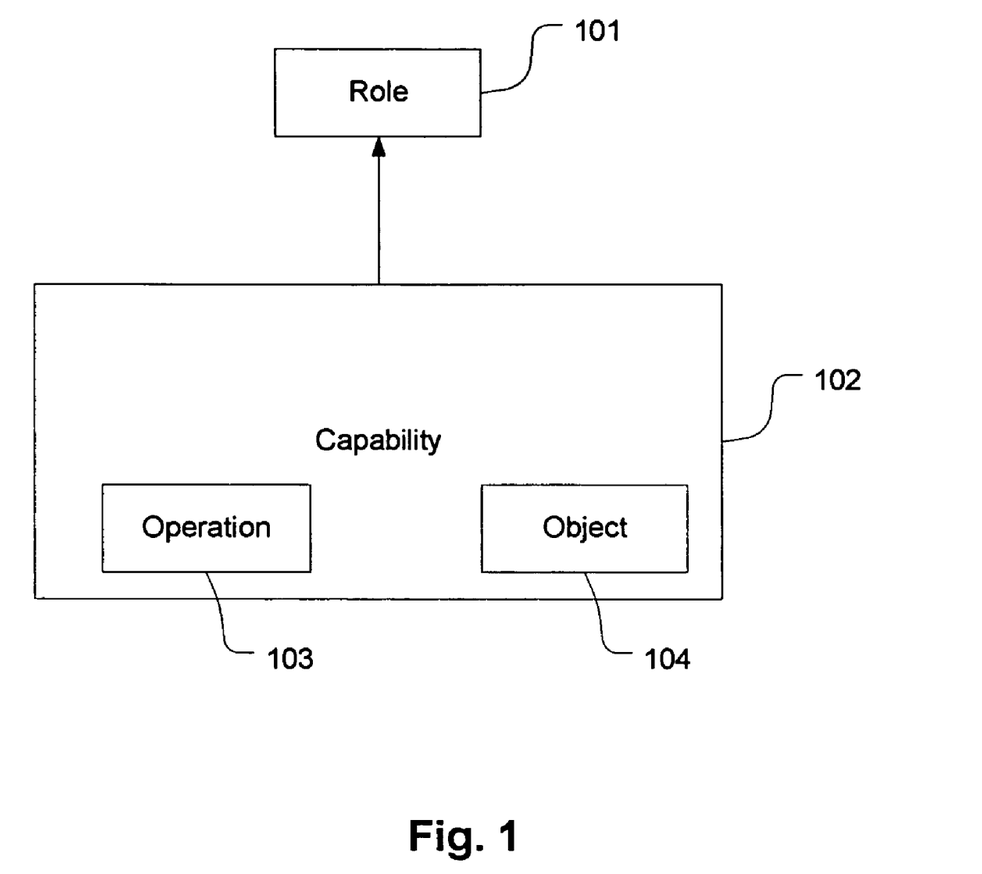
FIG. 1 illustrates a Role Based Access Control (RBAC) system.

FIG. 1 illustrates a Role Based Access Control (RBAC) system. As shown, a capability 102 can be assigned to a role

101. A role is defined as a certain authority level. For example, a system administrator of a storage system may be defined as a role having the authority of managing and monitoring the overall function of the storage server. The capability 102 includes an operation 103 and an object 104, meaning that the role 101 to which the capability 102 is assigned is authorized to perform the operation 103 on the object 104. In an exemplary embodiment, the capability 102 may be implemented as an attribute of the role 101. In yet another exemplary embodiment, the role 101 may include a pointer pointing to the capability 102 assigned to the role 101. The operation 103 may be an operation or a user defined operation. For example, in a file system, an example of operation is creating a file in the file system. In a banking system, an example of user defined operation is creating a checking account for a customer.

The object 104 defines the target on which the operation 103 is to be performed. The object 104 may be any kind of physical or logical entity. For example, in a network storage environment, the object 104 may be a file system, a volume, a directory, a file, etc. Yet in the banking system mentioned above, the whole banking system would be the object 104 within which a checking account for the customer may be created.

More than one capability 102 may be assigned to a single role 101 simultaneously so that the role 101 is authorized to perform multiple operations on multiple objects. A role 101 may be assigned to a user (a system administrator, for example) or a software process so that the user/process may assume the capability or capabilities assigned to the role 101.

One aspect of the solution being introduced here is a method for dynamically specifying the object 104 of a capability 102. Here, the phrase "dynamically specifying the object" means specifying the object by using an expression, and evaluating the expression to determine the identity of the object upon a request, rather than predetermining the identity of the object. One example is to use a regular expression to specify the object(s). A "regular expression" is a string that describes or matches a set of strings, according to certain syntax rules. Another example is to use a query to specify the object(s). When the object(s) needs to be identified, the query is executed, for example, in a database.

Figure 2:
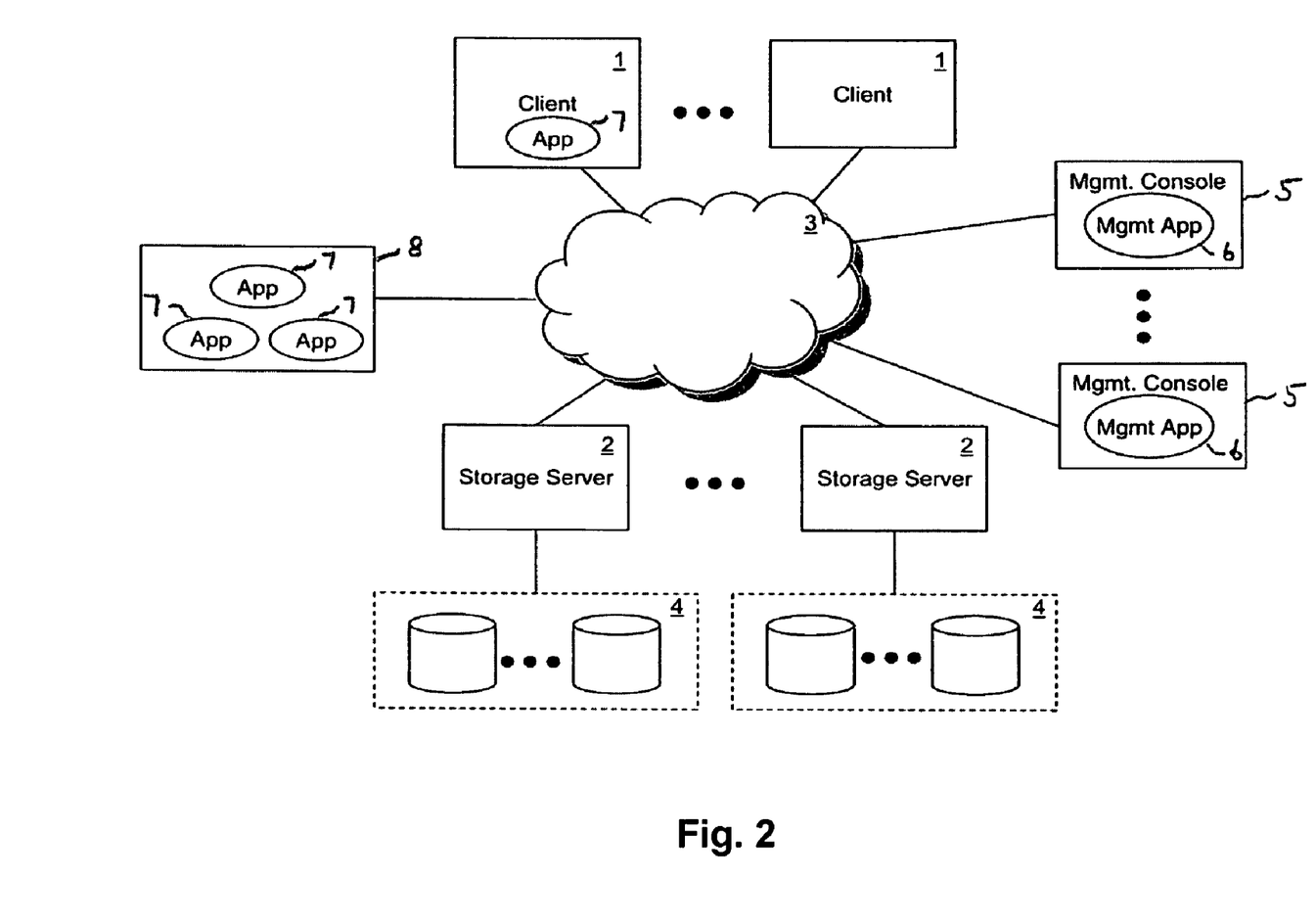
FIG. 2 shows a network environment in which the invention can be implemented.

FIG. 2 shows a network environment in which the solution can be implemented. In FIG. 2, a number of storage servers 2 are each coupled locally to a separate storage subsystem 4, each of which includes multiple mass storage devices. The storage servers 2 are also coupled through an interconnect 3 to a number of clients 1. Each storage subsystem 4 is managed by its corresponding storage server 2. Each storage server 2 receives and responds to various read and write requests from the clients 1, directed to data stored in or to be stored in the corresponding storage subsystem 4.

Each of the clients 1 may be, for example, a conventional personal computer (PC), server class computer, workstation, or the like. Each storage server 2 may be, for example, a file server used in a NAS environment (a "filer"), a block-based storage server such as used in a storage area network (SAN), or other type of storage server. In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol.

Also connected to the interconnect 3 are one or more management consoles 5, each of which includes a storage management application 6, such as a network storage manager discussed in detail below.

Recently, some storage servers have been designed to have distributed architectures, to facilitate clustering of storage nodes. Clustering facilitates scaling of performance and storage capacity. For example, rather than being implemented in a single box, a storage server may include a separate N- ("network") module and D- (disk) module, which are contained within separate housings and communicate with each other via some type of switching fabric or other communication medium. An N-module is an element that acts as a front-end of a storage server, exporting a file service abstraction to clients. A D-module manages the underlying storage. Each D-module typically manages a separate set of disks. Storage servers which implement the Data ONTAP® GX operating system from NetApp can have this type of distributed architecture.

Figure 3:
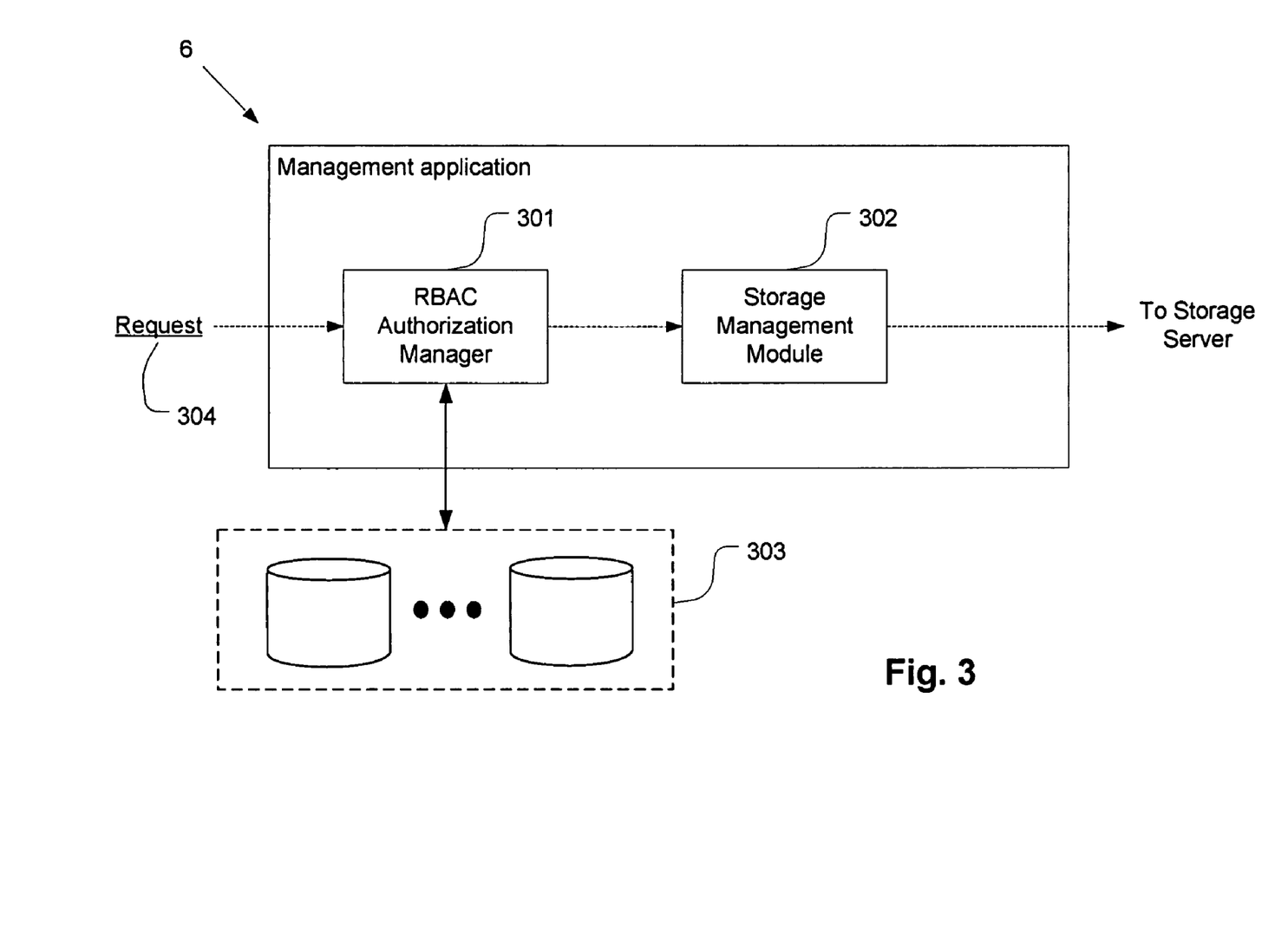
FIG. 3 is a schematic diagram of a management application shown in FIG. 2.

FIG. 3 is a schematic diagram showing an example of a management application 6 shown in FIG. 2. As shown in FIG. 3, the management application 6 includes an RBAC Authorization Manager 301 and a Storage Management Module 302. The Storage Management Module 302 receives a request 304, for example, for accessing a storage server 2. The request 304 may be formatted as including an operation and an object on which the operation is to be performed. The request 304 may be initiated by a user (a system administrator, for example) via the management console 5. It will be appreciated that a software process may also initiate the request 304. Thus, the request 304 may also include data representing the identity of the user. The Storage Management Module 302 forwards the request 304 (alternatively, only necessary data is forwarded) to the RBAC Authorization Manager 301 and asks the RBAC Authorization Manager 301 whether the request should be authorized. The RBAC Authorization Manager 301 receives the request 304, analyzes the request 304 and performs a look-up in the database(s) 303 to determine whether the request 304 should be authorized. The database(s) 303 stores data representing the roles, operations, objects and users of the storage system shown in FIG. 2. These data may be created by a system administrator who has the authority of making an addition, modification and/or deletion. If the RBAC Authorization Manager 301 authorizes the request 304, a positive response is sent back to the Storage Management Module 302. The response may be sent, for example, as a message. However, it will be appreciated that the response may be sent by other means. If the operation is to be performed on an object maintained by the Storage Management Module 302, the Storage Management Module 302 performs the operation directly. If, however, the object is maintained by the storage server 2, the Storage Management Module 302 performs the operation of the request by calling a specific command or Application Programming Interface (API) of the storage server 2. It will be appreciated that the object may be maintained by other applications as well. If the object is maintained by other applications, upon authorization, the Storage Management Module 302 performs the operation by calling a specific command or API of an application. The database(s) 303 may also store data related to the management of the storage servers 2, and/or objects maintained by the Storage Management Module 302 or other applications. The database(s) 303 may be either local or remote to the management application 6, and may be a regular relational database, a flat file, etc.

Figure 4:
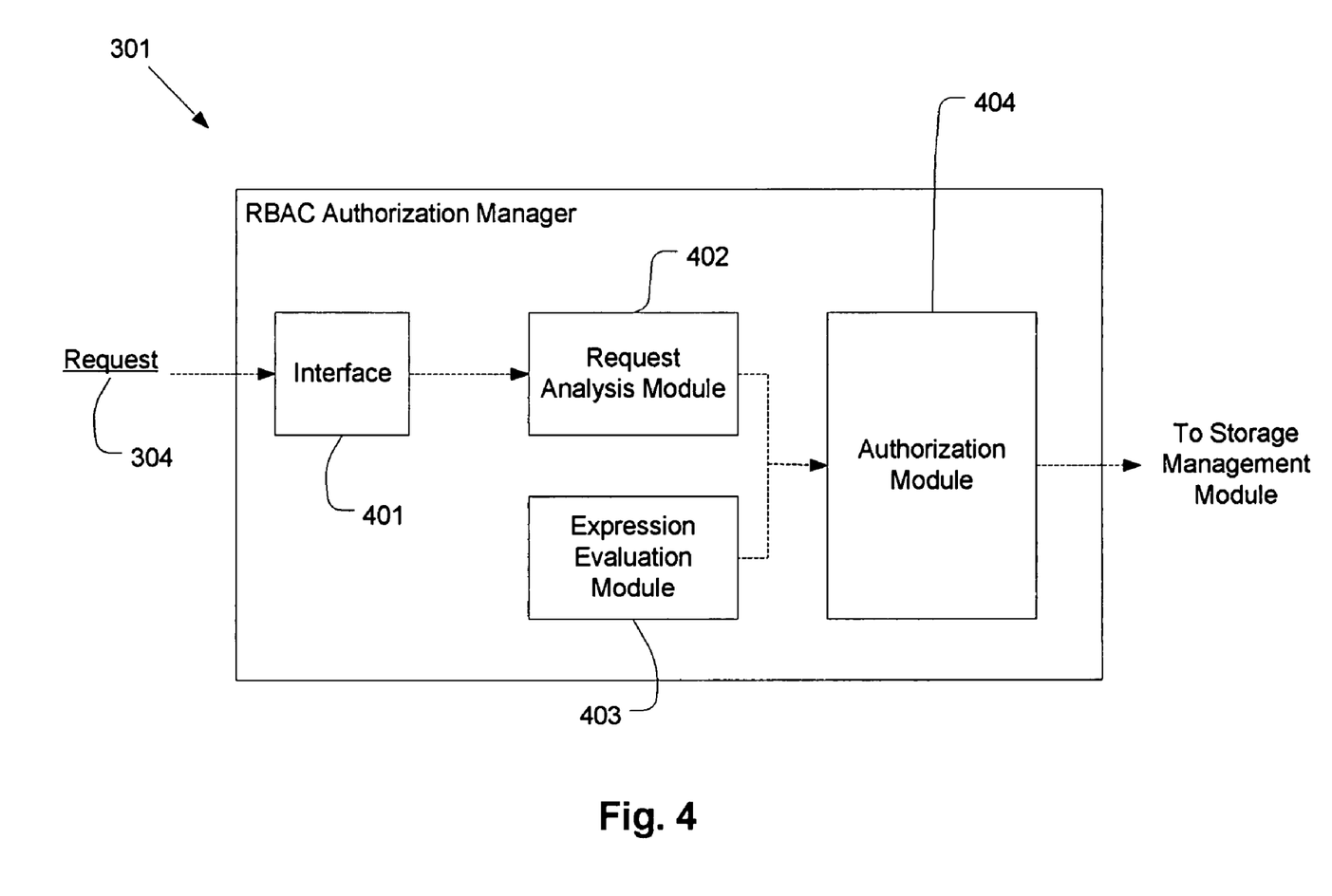
FIG. 4 is a schematic diagram of an RBAC Authorization Manager shown in FIG. 3.

FIG. 4 is a schematic diagram showing an example of an RBAC Authorization Manager shown in FIG. 3. As shown in FIG. 4, the RBAC Authorization Manager 301 includes an interface 401 to receive the request 405. The request 405 includes the user request 304. Alternatively, the request 405 just includes the necessary data from the user request 304. The necessary data may include the user who initiated the request 304, the operation associated with the request 304 and the object on which the operation is to be performed. The interface 401 provides a communication port between the RBAC Authorization Manager 301 and other modules of the management application 6. One example of the modules of the management application 6 is a Graphical User Interface which may receive an expression input by a system administrator. Yet another example is a Storage Management Module 302 which may call the RBAC Authorization Manager 301 to determine whether a particular user request should be authorized. The RBAC Authorization Manager 301 also includes a Request Analysis Module 402 to analyze the request 405 (in case user request 304 is directly enclosed) to identify the user who initiated the request 304, the operation associated with the request 304 and the object on which the operation is to be performed. Based on the identification of the user and the operation associated with the request, the Request Analysis Module 402 (or a separate module) looks up the database(s) 303 to determine whether there is a role assigned to the user. If there is a role assigned to the user, the Request Analysis Module 402 (or the separate module) further looks up in the database(s) 303 to determine whether the operation associated with the request matches the operation associated with any capability assigned to the role. If there is no such capability, then the request should be denied because the user has no such capability to perform the operation. If there is such a capability, then the following process is performed.

In an exemplary embodiment of the present invention, the object associated with the identified capability is specified with a regular expression when, for example, the capability is created by a system administrator (or any user who is authorized to manage the RBAC system). As introduced above, a regular expression is a string that describes or matches a set of strings, according to certain syntax rules. An example of regular expression syntax is the UNIX regular expression syntax, which is widely used for the purposes of compatibility. In the UNIX regular expression syntax, most characters are treated as literals, characters that match only themselves ("a" matches "a", "(bc" matches "(bc", etc). The exceptions are called metacharacters. One example of the metacharacters is "*", which matches any single character.

The RBAC Authorization Manager 301 further includes an Expression Evaluation Module 403. The Expression Evaluation Module 403 evaluates the regular expression to determine the object(s) associated with the capability. In an embodiment, in order to identify the object(s), the regular expression is matched against the names or IDs of all objects of the storage system 2. These names or IDs may be stored in a database (the database(s) 303, for example), or they may be obtained by calling a command or API of the storage server 2. The RBAC Authorization Manager 301 has an Authorization Module 404, which determines whether the object identified from the request 304 matches one of the object(s) identified by the Expression Evaluation Module 403. Here, a first object is considered to match a second object if the first object is the second object or a part of the second object.

Thus, for example, suppose a request is initiated by a user whose role is a "system administrator". The request is to "create a file" in "volume engineering_a". Assume a capability is defined as "create a file" in "volume engineering_*" and the capability is assigned to the role "system administrator". "Create a file" specifies the operation associated with the capability and the regular expression "volume engineering_*" specifies the object(s) on which the operation "create a file" may be performed by the role to which the capability is assigned. Upon receiving the request, the Expression Evaluation Module 403 evaluates the regular expression "volume engineering_*" to identify all of the volumes with a name starting with "engineering_" plus an extra character. For example, assume there are two volumes matching the regular expression, where one is "engineering_a" and the other is "engineering_b". Thus, the request should be authorized because the request is to "create a file" in "volume engineering_a", which matches one of the objects identified by the Expression Evaluation Module 403.

In another exemplary embodiment of the present invention, the object associated with the identified capability is specified with a query. To identify the object(s), the query is executed by the Expression Evaluation Module 403 against a database storing data related to all objects of the storage server 2. As noted, data related to all objects of the storage server 2 may be stored in the database(s) 303 or may be obtained by calling a command or API of the storage server 2. For example, suppose a query is "all volumes with name starting with 'engineering_'". Assume the storage server 2 has two volumes with name starting with "engineering_", the volume engineering_a and the volume engineering_b. Then, the results of the query are volumes engineering_a and engineering_b. The syntax of the query may follow a standard syntax (e.g., SQL) or may be customarily defined.

Alternatively, the object associated with the identified capability is specified with a function or API call. In response to a user request, the function or API call is evaluated, for example, against a library, to identify the object(s). For example, a function may be specified as get_all_volumes_with_prefix ("engineering_"). Upon evaluation of the function, volumes engineering_a and engineering_b will be returned if they are the only ones match.

Note that the each of the modules introduced above (the Interface 401, the Request Analysis Module 402, the Expression Evaluation Module 403 and the Authorization Module 404) can be software, special-purpose circuitry, or combination thereof.

Figure 5:
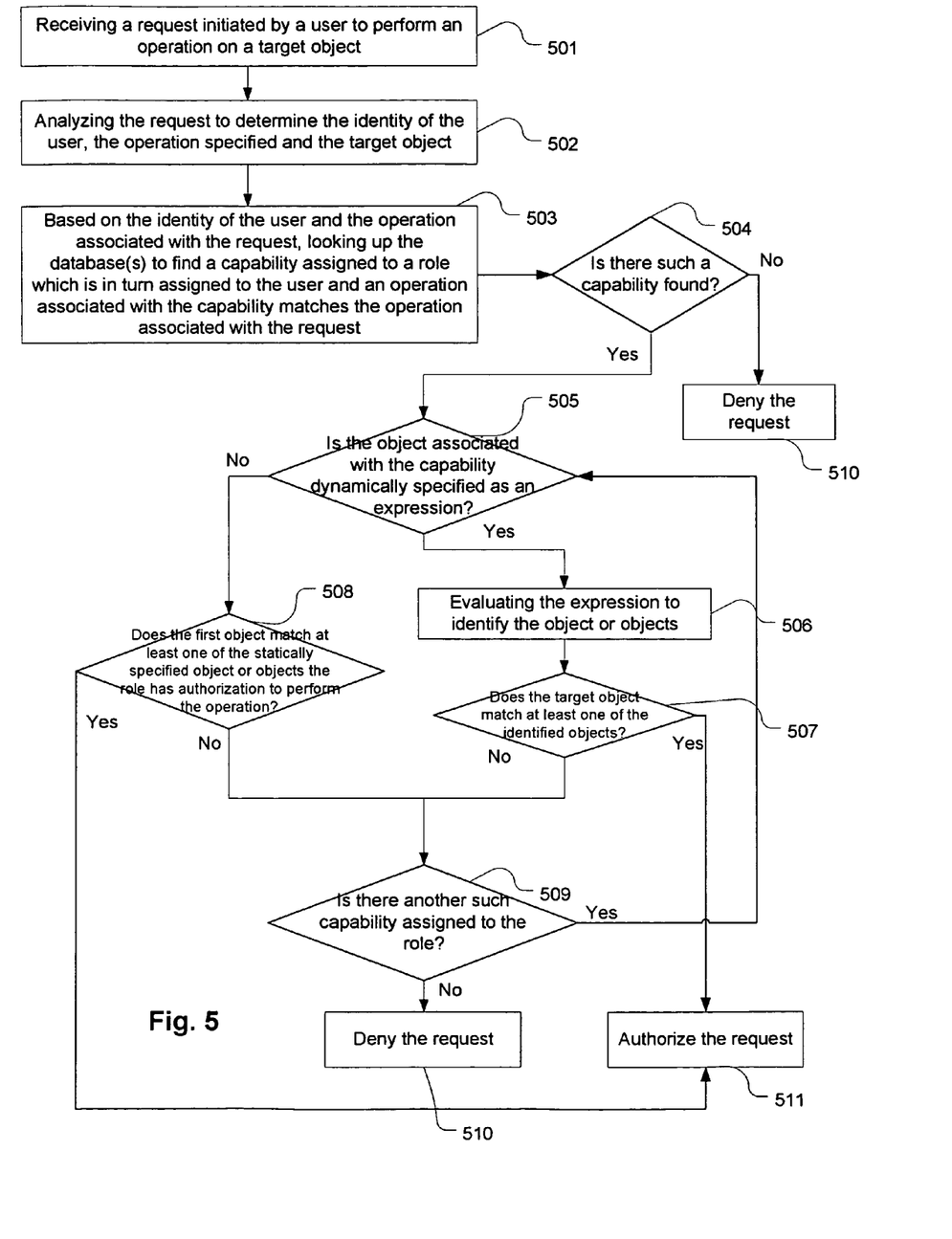
FIG. 5 is a flow diagram illustrating a process of access control according to an embodiment of the present invention.

FIG. 5 is a flow diagram illustrating an example of a process of access control according to the solution introduced here. FIG. 5 is illustrated with reference to FIGS. 3 and 4. At step 501, the interface 401 receives a request, perhaps, initiated by a user or a software process to perform an operation on an object. It should be appreciated that a software process could initiate a request. At step 502, the Request Analysis Module 402 analyzes the request to determine the identity of the user, the operation requested and the object on which the operation is intended to be performed. For illustration purposes, the object identified from the request is called the "target object". At step 503, based on the identity of the user and the operation associated with the request, the Request Analysis Module 402 (or a separate module) looks up in the database(s) 303 to find a capability. The capability should have been assigned to a role, which is in turn assigned to the user, and an operation associated with the capability matches the operation associated with the request. Here the operation associated with the capability matches the operation associated with the request if they are the same operation. At step 504, the process determines whether such a capability is found at step 503. If there is no such capability found at step 503, then the request is denied at step 510. If there is such a capability found at step 503, then at step 505, the process determines whether the object associated with the capability is dynamically specified via an expression (e.g, a regular expression, a query, etc.) If the answer is yes, then at step 506, the Expression Evaluation Module 403 evaluates the expression to identify the object(s) associated with the capability. At block 507, the Authorization Module 404 determines whether the "target object" matches one of the object(s) identified by the Expression Evaluation Module 403. If so, at step 511, the request initiated by the user is authorized. Otherwise, at step 509, the process determines whether there is another such capability assigned to the role. If the answer is no, the request is denied. If there is another such capability assigned to the role, the process goes back to step 505 again. On the other hand, if the process determines at step 505 that the object associated with the capability is statically specified (i.e., the identity of the object is predetermined already), then at step 508, the Authorization Module 404 determines whether the "target object" matches the statically specified object. If so, the request is authorized. If the "target object" does not match the statically specified object, the process goes to step 509.

Figure 6:
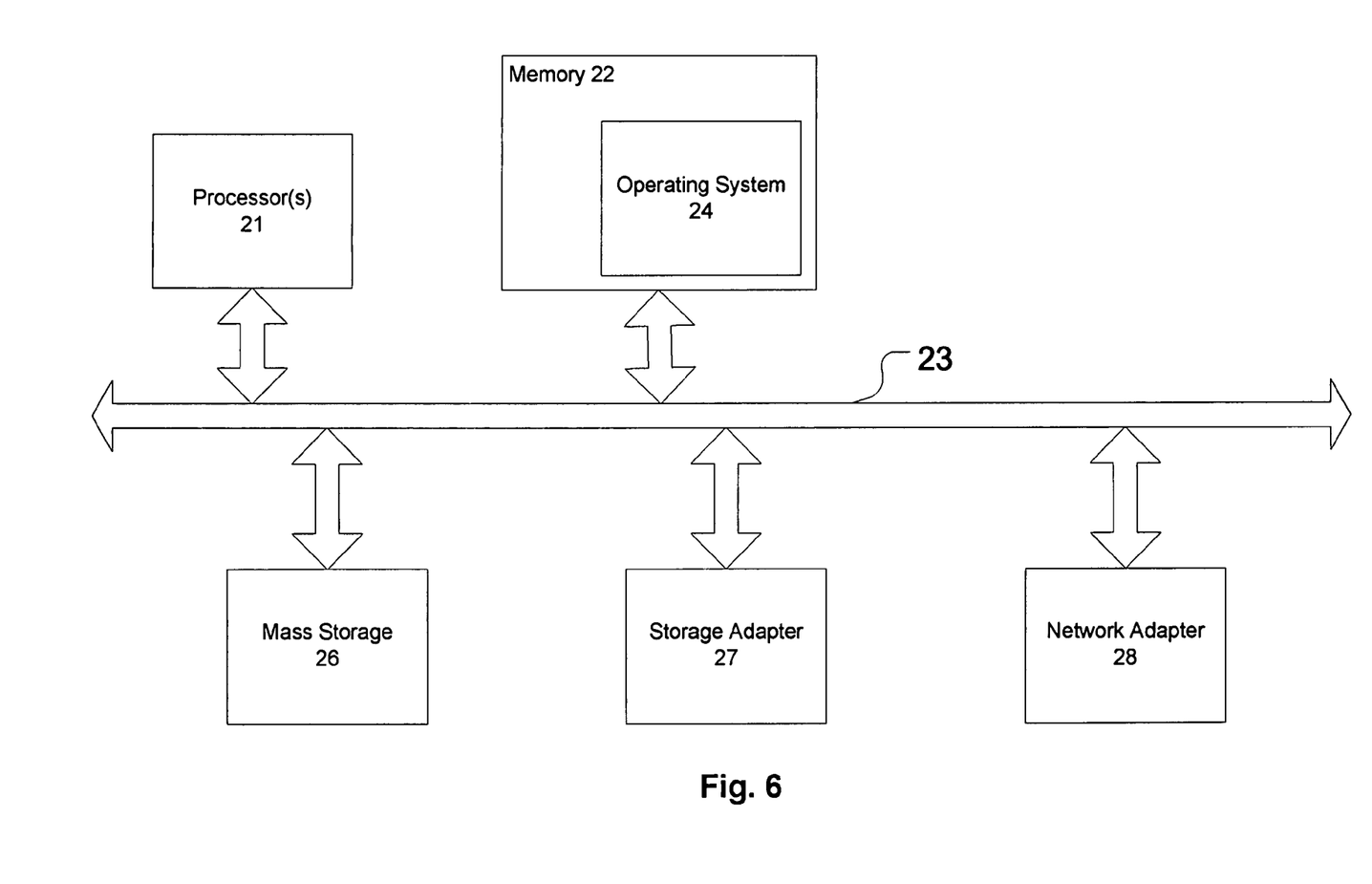
FIG. 6 is a high-level block diagram showing an example of the hardware architecture of a processing system.

FIG. 6 is a high-level block diagram showing an example of the hardware architecture of a processing system. The hardware architecture may be representative of either the storage server 2 or the management console 5 of FIG. 1. Certain standard and well-known components which are not germane to the present invention are not shown.

The processing system includes one or more processors 21 coupled to a bus system 23. The bus system 23 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The processors 21 are the central processing units (CPUs) of the processing system and, thus, control the overall operation of the processing system. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 22 coupled to the bus system 43. The memory 22 represents any form of random access memory (RAM), read-only memory (ROM), flash memory, or a combination thereof. Memory 22 stores, among other things, the operating system 24 of processing system or the storage management application 6.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the processing system to access a storage subsystem and may be, for example, a Fibre Channel adapter or a SCSI adapter. The network adapter 28 provides the processing system with the ability to communicate with remote devices over a network and may be, for example, an Ethernet adapter or a Fibre Channel adapter. Memory 22 and mass storage device 26 store software instructions and/or data, which may include instructions and/or data used to implement the techniques introduced here.

Thus, a method and system for controlling access to dynamically specified resources have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   in a role based access control system, receiving a request to perform an operation on a target object;
   analyzing, by a system having a processor, the request to determine a role associated with the request;
   determining a capability associated with the role, wherein the capability comprises an expression to specify all objects on which the role has authorization to perform an operation, wherein the expression comprises a data string to be compared to a set of data strings according to certain syntax rules;
   evaluating the expression in the role based access control system to identify all the objects on which the role has authorization to perform the operation;
   determining whether the target object matches one of the objects on which the role has authorization to perform the operation; and
   if the target object matches one of the objects on which the role has authorization to perform the operation, authorizing the request to perform the operation on the target object.

2. The method of claim 1, wherein the target object is considered to match one of the one or more objects if the target object is one of the one or more objects or a part of the one or more objects.

3. The method of claim 1, wherein the expression comprises a regular expression.

4. The method of claim 1, wherein the expression comprises a query, and wherein evaluating the expression in the role based access control system to identify the one or more objects comprises executing the query in a database of the role based access control system to identify the one or more objects.

5. The method of claim 4, wherein the database maintains information regarding objects of the role based access control system or another system.

6. The method of claim 1, wherein the expression comprises a function, and wherein evaluating the expression in the role based access control system to identify the one or more objects comprises executing the function to identify the one or more objects.

7. The method of claim 1, wherein said method is performed by a network storage manager running on a management console coupled to a storage server via an interconnect.

8. The method of claim 7, wherein the one or more objects comprise one of storage objects, network objects, and a combination of storage objects and network objects.

9. The method of claim 1, wherein the role defines an authority level.

10. A processing system comprising:
   a processor;
   an interface through which to communicate with a storage server, the interface to receive a request to perform an operation on a target object;
   a memory coupled to the processor;
   a first module to analyze the request to determine a role associated with the request and to determine a capability associated with the role, wherein the capability comprises an expression to specify all objects of the storage server on which the role has authorization to perform an operation, wherein the expression comprises a data string to be compared to a set of data strings according to certain syntax rules;
   a second module to evaluate the expression to identify all the objects on which the role has authorization to perform the operation; and
   a third module to authorize the request if the target object matches one of the objects on which the role has authorization to perform the operation.

11. The processing system of claim 10, wherein the expression comprises a regular expression.

12. The processing system of claim 10, wherein the expression comprises a query, and wherein evaluating the expression to identify the one or more objects comprises executing the query in a database to identify the one or more objects, the database storing management information related to the storage server.

13. The processing system of claim 12, wherein the first, second and third modules are part of a role based access control system of the processing system.

14. The processing system of claim 13, wherein the one or more objects of the storage server comprise one of storage objects, network objects, and a combination of storage objects and network objects.

15. The processing system of claim 14, wherein the role based access control system and the database are part of a network storage manager of the processing system.

16. The processing system of claim 10, wherein the role defines an authority level.

17. A machine-readable medium having sequences of instructions stored therein which, when executed by a processor of a processing system, cause the processor to perform a process comprising:
   receiving a request to perform an operation on a target object;
   analyzing the request to determine a role associated with the request;
   determining a capability associated with the role, wherein the capability comprises an expression to specify all objects of a storage server on which the role has authorization to perform an operation, wherein the expression comprises a data string to be compared to a set of data strings according to certain syntax rules, the storage server being coupled to the processing system via an interconnect;
   evaluating the expression to identify all the objects of the storage server on which the role has authorization to perform the operation;
   determining whether the target object matches one of the objects on which the role has authorization to perform the operation; and
   if the target object matches one of the objects on which the role has authorization to perform the operation, authorizing the request to perform the operation on the target object.

18. The machine-readable medium of claim 17, wherein the target object is considered to match one of the one or more objects if the target object is one of the one or more objects or a part of the one or more objects.

19. The machine-readable medium of claim 17, wherein the expression comprises a regular expression.

20. The machine-readable medium of claim 17, wherein the expression comprises a query, and wherein evaluating the expression to identify one or more objects comprises executing the query in a database to identify the one or more objects, the database storing management information related to the storage server.

21. The machine-readable medium of claim 17, wherein the expression comprises a function, and wherein evaluating the expression to identify the one or more objects comprises executing the function to identify the one or more objects.

22. The machine-readable medium of claim 17, wherein one or more objects comprise one of storage objects, network objects, and a combination of storage objects and network objects.

23. The machine-readable medium of claim 17, wherein the role defines an authority level.

* * * * *